United States Patent Office 3,666,424
Patented May 30, 1972

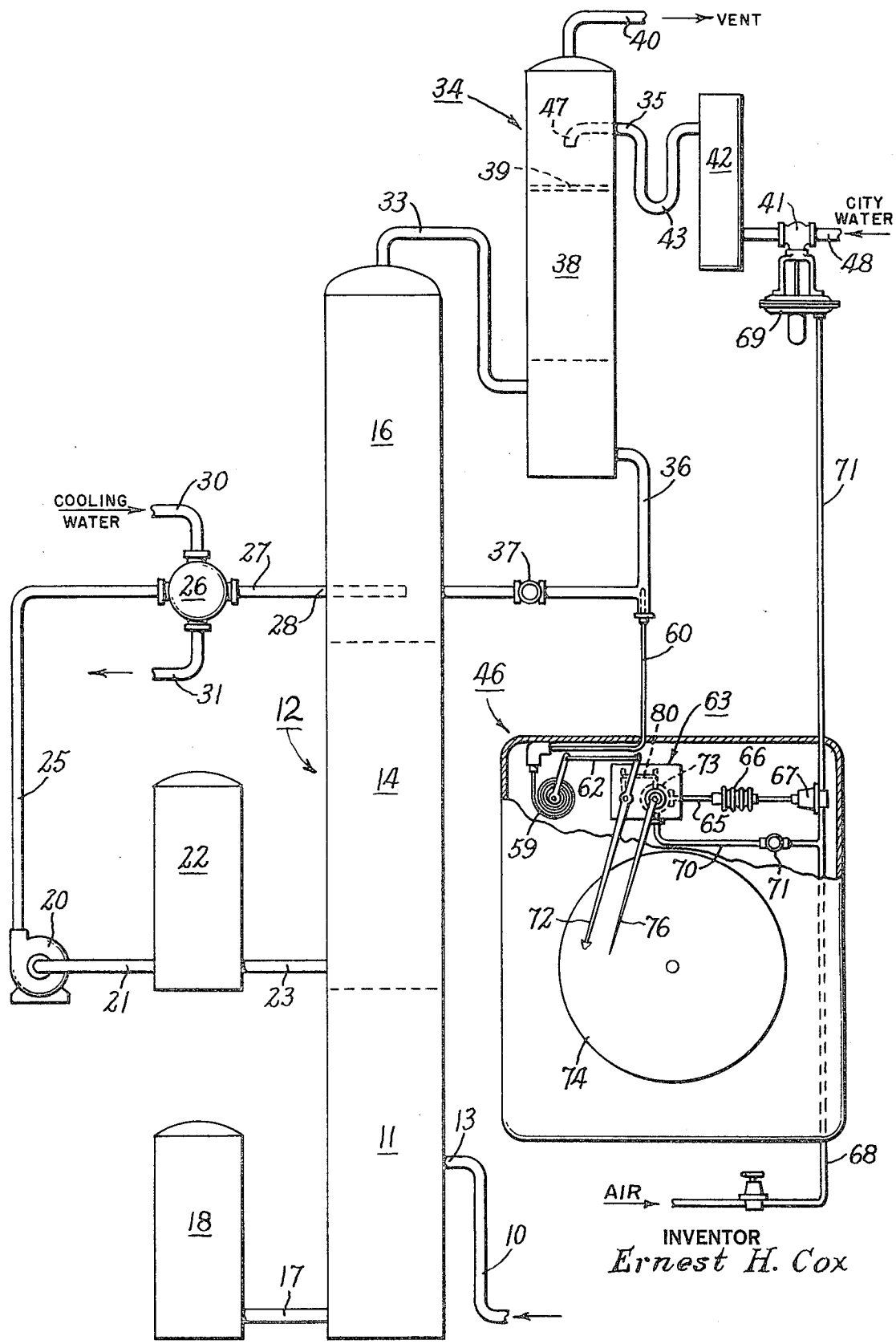

3,666,424
CONSTANT CONCENTRATION HYDROCHLORIC ACID BY VARYING WATER FEED PROPORTIONALLY TO TEMPERATURE
Ernest H. Cox, Long Branch, N.J., assignor to Tenneco Chemicals, Inc.
Filed Apr. 5, 1968, Ser. No. 719,060
Int. Cl. C01b 7/08; B01d 11/00
U.S. Cl. 23—312 R  3 Claims

ABSTRACT OF THE DISCLOSURE

The present invention relates to a novel method of producing aqueous hydrochloric acid at a substantially constant concentration despite variations in the rate of flow of hydrogen chloride feed gas. The gas flows continuously into and through an initial body of concentrated aqueous hydrochloric acid in an absorption column in which a portion of the gas is dissolved with the remainder of the gas being discharged as tail gas. The concentrated acid is cooled and maintained at a constant temperature that will provide the desired concentration of acid which is continuously discharged as product. The unabsorbed gas (tail gas) is flowed together with water to form dilute acid fed to the absorption column containing concentrated acid. The normal rate of flow of water is varied in accordance with variations in the flow of tail gas from a normal rate of flow so that the total amount water flowing into contact with the tail gas is such as to provide a product of the desired concentration. In a preferred embodiment, the rate of flow of water is varied in accordance with variations in the temperature of the dilute acid caused by variations in the amounts of tail gas and the heat generated as a result of variation in the rate of flow of feed gas.

This invention relates to a process of continuously producing aqueous hydrochloric acid at the desired constant concentration.

In many industrial processes, for example, the chlorination of hydrocarbons including toluene, large quantities of HCl gas are formed. In many such reactions two moles of HCl gas are produced as a by-product for each mole of chlorine reacting with the hydrocarbon. These large quantities of HCl gas can not be vented to the atmosphere as it is both poisonous and highly corrosive and would cause a large amount of damage. Customarily, the HCl gas is dissolved in water to form aqueous hydrochloric acid. However, in many industrial plants the amount of HCl gas produced as a by-product will vary, at least at times, over a very wide range. In order to be sure that all of the gas is dissolved and no substantial quantity of harmful gas is vented to the atmosphere, large quantities of water are used resulting in the production of large quantities of very dilute aqueous hydrochloric acid varying in concentration over a wide range. Very dilute acid is of little or no commercial value and the variations in concentration further reduce any possible commercial value of the acid. In practice, such acids not only have no commercial value but frequently it is necessary to pay for having the acid hauled away for disposal.

The present process continuously produces aqueous hydrochloric acid at a substantially constant, predetermined, commercially-valuable concentration from water and hydrochloric acid feed gas when the rate of gas flow varies at times. The feed gas first is partially absorbed in a body of hydrochloric acid of substantially constant concentration and the remaining unabsorbed gas, tail gas, is absorbed in water to form dilute aqueous acid which is fed to the first-mentioned body of concentrated acid. The rate of flow of water to the dilute acid solution is equal to the amount of water necessary for the rate of flow of hydrochloric acid feed gas to form the concentrated acid. The rate of flow of tail gas varies with variations in the rate of flow of feed gas and it has been found that the rate of flow of water can be varied in accordance with changes in the temperature of the dilute acid resulting from changes in the rate of flow of feed gas and tail gas to supply the correct amount of water to the system whereby aqueous hydrochloric acid of uniform concentration is continuously produced.

The attached diagrammatic drawing shows the apparatus for carrying out the present process.

In describing the present invention, it is to be assumed, unless otherwise stated, that the process has been started up. The term "concentrated" and "dilute" are used as relative terms to distinguish between portions of the apparatus and different portions or bodies of aqueous hydrochloric acid.

Referring to the drawings, hydrochloric acid gas from a suitable source, not shown, is continuously supplied through pipe 10 into the lower portion 11 of the absorber column 12 at 13. The column 12 includes a middle portion 14 preferably packed with ceramic saddles to increase contact between the upwardly flowing gas and the downwardly flowing aqueous hydrochloric acid. When in operation the bottom portion 11 of column 12 is filled with a body of aqueous acid and the upper or top portion 16 of column 12 is partially or substantially filled with aqueous acid. The aqueous acid in column 12 is concentrated aqueous hydrochloric acid although, as will be more fully hereinafter described, the concentration at the bottom of the column is somewhat higher than at the top. Aqueous hydrochloric acid of the desired concentration is continuously discharged at the rate found from the bottom of column 12 through pipe 17 to storage tank 18 or any other suitable receiver.

As is well known, when hydrochloric acid is absorbed in water, heat is generated. It also is well known that the amount of gas absorbed and the resulting maximum concentration of the aqueous acid depends to a certain extent upon the temperature. Accordingly, the column 12 is provided with cooling means to remove exothermic heat from the acid in the column and to maintain the acid in the column at that temperature which results in the formation of aqueous hydrochloric acid of the desired concentration. The higher the temperature of the acid in column 12, the lower the concentration and vice versa. As shown, the cooling and temperature controlling means includes a circulating pump 20 connected through pipe 21 to surge tank 22 and pipe 23 to a lower portion of column 12 for withdrawing acid. The pump 20 is connected by pipe 25 to a cooler 26 which is in turn connected through pipe 27 to a relatively higher portion of column 12 at 28. Cooler 26 is connected by pipe 30 to a source of cooling water, not shown, and by pipe 31 to a sewer or other suitable point of discharge. The rate of flow of cooling water through cooler 26 is controlled and varied, if necessary, to remove the desired amount of heat from the recirculated stream of acid. Normally, the pump 20 is operated at a constant speed and the rate of flow of cooling water is varied although, in general, the rate of flow of cooling water is substantially constant over substantial periods unless the temperature of the cooling water changes or concentration of the product acid discharged from the bottom of column 12 through pipe 17 is changed materially over substantial periods of time.

A major portion but not all of the gas feed is absorbed in column 12. The unabsorbed gas, tail gas, which may be a small or substantial amount, is discharged from column 12 through pipe 33 to an absorber column 34 which receives water from pipe 35. The tail gas is absorbed in the relatively dilute acid in column 34. Dilute acid is discharged from column 34 through pipe 36 into the upper portion of column 12. Valve 37 in pipe 36 can be adjusted to control the flow of dilute acid or the levels of columns 12 and 34 may be arranged to maintain by gravity the desired amount of dilute acid in column 34 and concentrated acid in column 12. Preferably, the middle portion 38 of column 34 is packed with ceramic saddles to assure good contact between the upwardly flowing gas and downwardly flowing water. The pipe 35 is connected to an outlet portion 47 arranged to discharge the water downwardly onto a distributing plate 39 above the packing. The downwardly flowing water absorbs the tail gas to form dilute aqueous hydrochloric acid which collects in the lower portion of column 34 which is provided at the top with a vent 40. Normally, all of the tail gas is absorbed in column 34. However, the vent 40 may be connected to a scrubber, not shown, to assure that no gas escapes to the atmosphere under abnormal conditions.

Water for the system is supplied through pipe 48 connected to a suitable source such as a city water system. Pipe 40 contains a pneumatic control valve 41 for controlling the rate of water flow and is connected through a rotometer 42 which provides a visual check on the rate of water flow to pipe 35 containing a gas seal loop 43. Under any given set of conditions the amount of water discharged into the tail gas absorber through pipe 38 plus the amount of gas discharged into column 12 at 13 will equal the amount of concentrated acid discharged through pipe 17.

A controller 46 controls the rate of flow of water through valve 41 to the tail gas absorber 34 and increases or decreases the rate of flow of water in response to a rise or fall in the temperature of the dilute acid formed in absorber 34 and discharged through pipe 36 and then into column 12.

The controller 46 is shown schematically and may be any one of the commercially available controllers on the market. The controller 46 includes a temperature responsive movable coil 59 connected through tube 60 to pipe 36. Coil 59 is connected through link 62, pen arm 72 and link 80 to a valve mechanism 63 which in turn is connected through tube 65 to a bellows 66 which is connected to a control valve 67 in air line 68 which is connected to a source of air (not shown) and to the control 69 of valve 41 through tube 71. The control mechanism 63 is connected through air line 70 and a pressure control valve 71 to air line 68 so that air under pressure is supplied to tube 65. In the mechanism 63, line 80 is connected to an arm 72 having on its outer end a pen device which marks a line on circular, temperature scaled paper on the constantly rotating table 74. Thus, a record is kept of the temperature in pipe 36. Valve mechanism 63 is provided with a valve 73 which can be manually adjusted to provide the air pressure in tube 65 which will actuate bellows 66 and valve 67 so that the air pressure in line 71 will operate control 69 and open valve 41 to provide the normal rate of flow of water to the tail gas absorber 34. Valve 73 also is provided with a pointer 76 which extends over table 74 so that the end of the pointer will show above the graph paper (not shown) on table 74 the setting for the normal temperature.

In operation and after the system has reached equilibrium, the control 73 is set to provide the normal rate of water flow to absorber 34 to maintain the normal temperature in the absorber 34 and the normal temperature of dilute acid to absorber 12 so that concentrated acid of the desired concentration is discharged through pipe 17. If the rate of flow of acid into the absorber 12 increases, there is an increase in the amount of tail gas and the temperature of the dilute acid in absorber 31 and pipe 36 will rise. The temperature responsive coil 59 will move line 62 and this will swing the end of arm 72 outwardly and the increase in temperature will be recorded on the graph paper. The movement of link 62 also moves link 80 which opens valve 73 wider to increase the pressure in tube 65 and bellows 66 which will actuate valve 67 to increase the air pressure in line 71 and control 69 will open valve 44 to increase the rate of flow of water to absorber 34. This increase in water flow may lower the temperature in absorber 34 and the temperature responsive device 59 will move link 62 and the arm 72 to record this new temperature. However, the valve 73 is such that the flow of water will not be reduced below that amount required to provide the desired concentration of product acid. Thus, while there may be a slight "hunting" by the controller upon a change in flow of feed gas it will settle to provide desired and necessary rate of flow of feed water. If the temperature in absorber 34 drops, controller 46 will operate in a reverse manner to decrease the rate of flow of water to that amount which will provide the desired concentration in the bottom portion of absorber 12. The controller actually used is an Air-O-Line controller, Model No. 602 PI–E–93–III–74 sold by Minneapolis Honeywell.

The present apparatus is designed to operate continuously over long periods of time once the start-up procedure has been completed. The system may be started, for example, by filling column 12 and the bottom portion of column 34 with water by manual operation of valve 41. The cooling water for cooler 26 is turned on and the pump 20 is started. Preferably, water is slowly fed into the tail gas absorber 34. The flow of hydrochloric gas is turned on, preferably slowly, and at first all or at least most of the gas will be absorbed in column 12 and this dilute acid may be recycled through column 34 and back to column 12. When the concentration reaches the desired point, the controls for automatically controlling the flow of water to the system can be actuated and the discharge of concentrated acid from column 12 through pipe 17 can be started.

Having described the general operation of the present apparatus, a more detailed description will be given for the apparatus when designed for absorbing an average amount of hydrochloric acid gas per hour with the rate of flow varying between maximum and minimum amounts, although it is to be understood that the apparatus could be designed for different capacities. In addition, it will be assumed that the start-up procedure has been completed and the system has reached equilibrium for an average rate of flow. The apparatus when designed for an average flow of hydrochloric acid gas of 1,310 lbs. per hour which may vary, for example, from a minimum of 230 lbs. per hour to a maximum of 2,300 lbs. per hour, will require an average flow of water into column 34 of 2,860 lbs. per hour varying according to the gas flow from a minimum of 500 lbs. per hour to a maximum of 5,000 lbs. per hour to produce a 20° Bé. product. Obviously a 22° Bé. product will require a corresponding smaller amount and rate of flow or water. The recirculation rate of acid through pump 20 is 200 gallons per minute for the average rate of production with the rate of flow of gas at 1310 lbs. per hour and the temperature in column 12 is 43° C. for a 20° Bé. product or 30° C. for a 22° Bé. product and the temperature of the acid flowing into column 12 at 18 is 35° C. for a 20° Bé. product or 22° C. for 22° Bé. product. The rate of flow of cooling water through cooler 26 may be varied, if necessary to maintain these temperatures as these temperatures must be maintained for these concentrations of acid. It is to be understood that other means known to the art may be used to remove the exothermic heat and maintain the desired temperature in the column and thereby control the concentration of the aqueous acid in the column.

Assuming the rate of flow of hydrochloric gas suddenly increases, the concentration of the acid in column 12 will tend to increase and the amount of tail gas flowing from column 12 to column 34 will increase causing the temperature in column 34 and the temperature of the acid in overflow pipe 36 to rise. The controller will then automatically adjust valve 41 as previously described to increase the flow of water to column 34 and this increase in water flow will cause the temperature in column 34 to tend to level out at the normal control temperature, for example 25° C. when the water supply has a temperature of 16° C. The increased flow from column 34 to column 12 will counteract the initial rise in concentration in column 12 and reduce the concentration back to the desired concentration and again establish equilibrium conditions. With the increased rate of flow of gas it also may be desirable to increase the rate of flow of cooling water through cooler 26.

The present apparatus is designed to handle an average or normal rate of flow of 1310 lbs. of HCl gas per hour which may vary from a minimum of 230 to a maximum of 2,300 lbs. per hour. For these rates of flow of gas, the amount of water required will be 2,860 lbs. per hour on the average but varying from a minimum of 500 to a maximum of 5,000 lbs. per hour to form a 20° Bé. product. The product rate of flow from section 11 will be on the average 4,170 lbs. per hour varying from a minimum of 730 lbs. per hour to a maximum of 7,300 lbs. per hour. The average temperature of the 20° Bé. product flowing out through pipe 17 will be 48° C.

There is a difference in the concentration of the acid withdrawn from the bottom of section 11 and discharged to the top of section 11. For a 20° Bé. product the concentration will be 19.8° Bé. at the bottom and 19.1° Bé. at the top. For a 22° Bé. product the concentration will be 22° Bé. at the bottom and 21.5° Bé. at the top.

Under average conditions the recirculation rate is such that the temperature of acid out of section 14 of column 12 is 43° C. for a 20° Bé. product or is 30° C. for a 22° Bé. product. The temperature of the acid returned to a column 12 is 35° C. for a 20° Bé. product or 22° Bé. product. Control of these temperatures is maintained by the flow rate and the cooling water temperature. It is to be noted that when the acid is withdrawn from the bottom of the column, the acid may have a somewhat higher temperature as some gas may be absorbed in section 11 and the gas may tend to warm the acid; however, the temperatures in the column must be maintained substantially constant to provide a product of a substantially constant concentration. In practice it has been found that the desired concentration of the product can be maintained within the range of ±½ Bé. when the desired concentration is in the range of 20–22° Bé.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. A method for continuously producing aqueous hydrochloric acid having a substantially constant concentration, varying by not more than plus or minus ½° Baumé when preparing acid having a desired concentration in the range of from 20 to 22° Baumé, by the mixing of a water feed and a flow of hydrogen chloride feed gas, the gas varying from time to time in its rate of flow, the method comprises continuously flowing hydrogen chloride gas into and through a body of relatively concentrated aqueous hydrochloric acid, discharging any hydrogen chloride gas that is not dissolved in the acid as tail gas at a rate of flow varying with variations in the rate of flow of the feed gas, cooling and maintaining a substantially constant temperature in the lower portion of the body of relatively concentrated acid, continuously discharging from the lower portion aqueous hydrochloric acid product having a substantially constant concentration, flowing the tail gas and a water feed together to form a body of relatively dilute aqueous hydrochloric acid, discharging the dilute hydrochloric acid into the body of concentrated acid at a rate of flow varying with variations in the rate of flow of water, measuring the temperature of the discharged dilute acid and varying the water feed rate directly proportionally to changes in said temperature.

2. The method of claim 1 in which cooling of the concentrated acid is effected by withdrawing concentrated acid from the body of concentrated acid, cooling the withdrawn acid, and returning the cooled acid to the body of concentrated acid at a point above the point of withdrawal.

3. The method of claim 2 in which the product acid has a desired concentration in the range of from 20° to 22° Bé. and has an actual concentration in the range of plus or minus 0.5° Bé. of the desired concentration.

References Cited

UNITED STATES PATENTS

| | | | |
|---|---|---|---|
| 3,315,440 | 4/1967 | Alkemade | 23—312 X |
| 3,387,430 | 6/1968 | Sarvadi, Jr. | 23—154 X |

OTHER REFERENCES

Wilson: Chemical Engineering, July 1951, pp. 284 to 287, vol. 58.

Bingham: Chemical Engineering Progress, December 1960, vol. 56, #12, pp. 67 to 73.

Hunter: Amer. Inst. of Chem. Engin., vol. 37, #5, Oct. 25, 1941, pp. 741–759.

Fansteel: HCl Adsorption Systems, about Mar. 1, 1940, pp. 1 to 8.

Fansteel: Adsorption Systems for HCl, 1941, pp. 1–17.

NORMAN YUDKOFF, Primary Examiner

S. J. EMERY, Assistant Examiner

U.S. Cl. X.R.

23—270.5, 154; 55—46, 48